(12) United States Patent
Yoshihara et al.

(10) Patent No.: US 6,291,104 B1
(45) Date of Patent: Sep. 18, 2001

(54) STORAGE BATTERY

(75) Inventors: Yasuyuki Yoshihara; Kazuyoshi Yonezu; Go Kashio; Fumiaki Seta, all of Aichi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/181,374

(22) Filed: Oct. 28, 1998

(30) Foreign Application Priority Data

Dec. 5, 1997 (JP) ...................................................... 9-335359

(51) Int. Cl.⁷ ............................... H01M 4/14; H01M 4/16
(52) U.S. Cl. ................... 429/242; 29/2; 429/225
(58) Field of Search ....................... 29/2, 623.1; 429/233, 429/242, 243, 225, 60

(56) References Cited

U.S. PATENT DOCUMENTS

| | | | |
|---|---|---|---|
| 3,853,626 | * 12/1974 | Daniels, Jr. et al. . | |
| 4,284,693 | * 8/1981 | McDowell | 429/211 |
| 4,303,747 | * 12/1981 | Bender | 429/161 |
| 5,308,719 | * 5/1994 | Mrotek et al. | 429/160 |

\* cited by examiner

*Primary Examiner*—Carol Chaney
(74) *Attorney, Agent, or Firm*—Ratner & Prestia

(57) ABSTRACT

A lead-acid storage battery uses as a current collector an expanded grid produced by processing a belt shaped material formed of lead or lead alloys. Strand of a grid for negative electrodes have a twist. The extent of the negative electrode's grid is larger than that of the positive electrode's grid. Accordingly, degradation of output characteristics in the domain deep in the depth of discharge is prevented and further high rate discharge cycle life characteristics are improved.

9 Claims, 4 Drawing Sheets

STORAGE BATTERY

FIELD OF THE INVENTION

The present invention relates to a storage battery and, in particular, relates to a lead-acid storage battery for electric cars that require particularly high output characteristics.

BACKGROUND OF THE INVENTION

Prior art lead-acid storage batteries for electric vehicles have so far been used in golf carts, lawn mowers and the like and batteries with discharge characteristics of about 1 CA have served the intended purpose sufficiently.

However, electric cars among electric vehicles are required to show a driving performance (acceleration and gradability) comparable to that of gasoline-driven cars. Therefore, lead-acid storage batteries for electric cars are required to maintain extremely severe high rate discharge characteristics (output characteristics) over a wide range of depth of discharge when compared with the conventional lead-acid storage batteries for electric vehicles.

In addition, durability as represented by high rate discharge cycle life is also considered important. All in all, an improvement in the foregoing has been the problem involved with lead-acid storage batteries for electric cars.

A variety of methods for improving the output characteristics and high rate discharge cycle life have been studied.

For example, a development work has been carried out on a grid with an excellent current collecting efficiency. Further, such attempts as increasing reaction areas of electrodes and the like have so far been pursued by increasing the number of positive and negative electrodes through the use of thinner electrodes.

In general, there are a casting method and also an expanding method that uses a belt shaped sheet of lead or lead alloys prepared in advance by rolling and the like in the methods for producing a grid used in a lead-acid storage battery.

In the case of a grid produced by the casting method, it is possible to design a variety of grids having excellent current collecting efficiencies according to the design of casting dies. However, this casting method shows poor productivity and further makes it very difficult to produce thinner grids that are needed to improve the output characteristics of a lead-acid storage battery. For the production of thinner grids, various methods such as a vacuum casting method and the like have been developed. Since batteries for electric cars are frequently in use, the batteries for electric cars are required to have a maintenance-free performance. Use of an alloy of lead and calcium in a grid is desirable to realize this maintenance-free performance but such a grid as above shows poor castability, thereby imposing limitations on the thickness of electrodes.

On the other hand, the expanding method is to apply slitting on a belt shaped material and then apply an expanding process to the slit belt shaped material, thereby producing a sheet with mesh-like expanded grids. This expanding method includes a process of continuous application of an active material to the sheet with mesh-like expanded grids and a process of cutting the sheet to specified dimensions.

Thus, the expanding method employed in the production of electrodes has shown such advantages as excellent productivity and easiness in reducing the thickness of electrodes by changing the thickness of sheet material.

Conversely, the expanding method has shown such a drawback as having a large strain created and remained at each respective connecting section of the mesh-like expanded grids due to the distinctions thereof, resulting in local corrosion caused to the positive electrodes that have used the electrodes thus prepared. However, it is also possible to produce grids that show almost the same resistance to corrosion as a grid produced by the casting method as a result of improvement in alloys.

By the use of grids produced with this expanding method it is possible to reduce the thickness of electrodes, thereby enabling an improvement in batteries' output characteristics.

Since there are no strand with this expanded grid as with a grid prepared according to the casting method, the batteries' output characteristics are extensively degraded in the domains of large depth of discharge, where conductivity of an active material itself is lost, thus resulting in a difficulty in maintaining a specified high output over a wide range of depth of discharge. This is attributed to the negative electrodes. In connection to high rate discharge cycle life characteristics, corrosion occurs in the grids of positive electrodes according to the lapse of cycles, further often causing the batteries' life to be shortened due to sulfation of the active material in negative electrodes.

The present invention provides a lead-acid storage battery, in which electrodes using grids prepared by an expanding method show excellent output characteristics even towards the end of discharge and also excellent high rate discharge cycle life characteristics.

SUMMARY OF THE INVENTION

A storage battery of the present invention includes a positive electrode, negative electrode and electrolyte material, in which the negative electrode has a first grid with a first grid geometry and a first active material provided on the first grid;

the positive electrode has a second grid with a second grid geometry and a second active material provided on the second grid; and the first grid is provided with a plurality of first strand that form a first twist and also provided with a first connecting section for each respective grid strand of the foregoing plurality of first strand.

Particularly desirable is that the foregoing second grid is provided with a plurality of second strand that form a second twist and also provided with a second connecting section for each respective grid strand of the foregoing plurality of second strand.

Further, particularly desirable is that the foregoing second grid is provided with a plurality of second strand that form a second twist and also provided with a second connecting section for each respective grid strand of the foregoing plurality of second strand, in which the foregoing first twist is larger than the second twist.

Still further, particularly desirable is that the foregoing first grid includes an expanded grid.

According to the structures as described in the above, degradation of the output characteristics in the domains deep in the depth of discharge is prevented. Moreover, the high rate discharge cycle life characteristics are improved.

By using a grid, which forms twists in mesh-like strand, in negative electrodes, the contact areas between the active material and the grid are increased, resulting in enhanced reactivity of negative electrodes.

Particularly, at the time of deep discharge when an active material is changed to insulating lead sulfate, excellent high rate discharge characteristics are still maintained.

In addition, by using a grid with twists as a current collector for negative electrodes, charge acceptability is enhanced and sulfation during the lapse of cycles is prevented. The sulfation means an phenomenon, in which an active material is changed to lead sulfate.

By using a grid with a small number of twists as a current collector for positive electrodes, grids' resistance to corrosion is enhanced and cycle life characteristics are improved.

KEY TO REFERENCE NUMERALS

1 Tab
2 Upper Framework Strand
3 Grid Strand
4 Grid Mesh
5 Connecting Section

DETAILED DESCRIPTION OF THE INVENTION

Figure 1A:
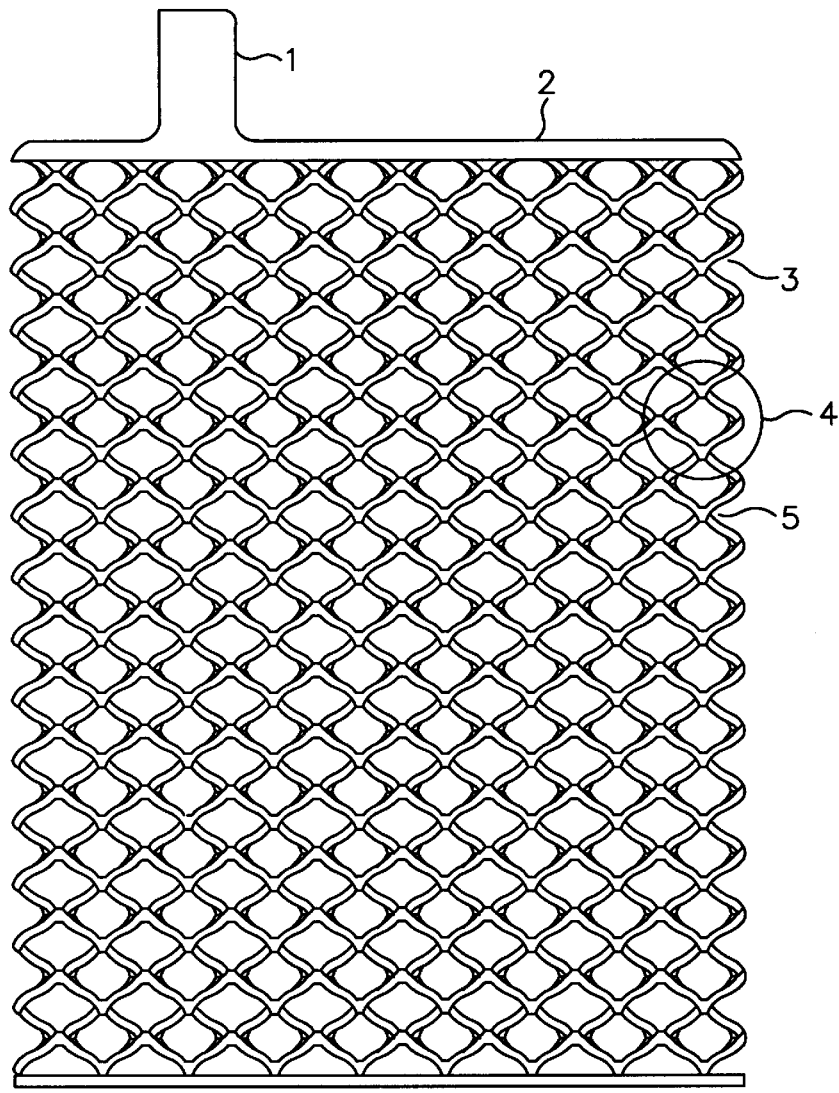
FIG. 1(a) is a plan view of a grid with twists for use in negative electrodes of a storage battery in an exemplary embodiment of the present invention.
Figure 1B:
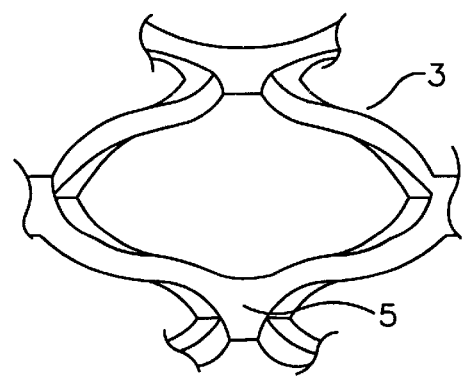
FIG. 1(b) is an enlarged view of connecting sections as shown in FIG. 1(a).

Next, an exemplary embodiment of the present invention will be explained with reference to drawings. FIG. 1(a) is a plan view of an expanded grid provided with twists. FIG. 1(b) is an enlarged view of connecting sections of the grid as shown in FIG. 1(a). In the present exemplary embodiment, the grid as shown in FIG. 1(a) is used as the grid for negative electrodes and the grid as shown in FIG. 2 is used as the grid for positive electrodes.

Grids are produced by using a belt shaped sheet of lead or lead alloys.

Figure 2:
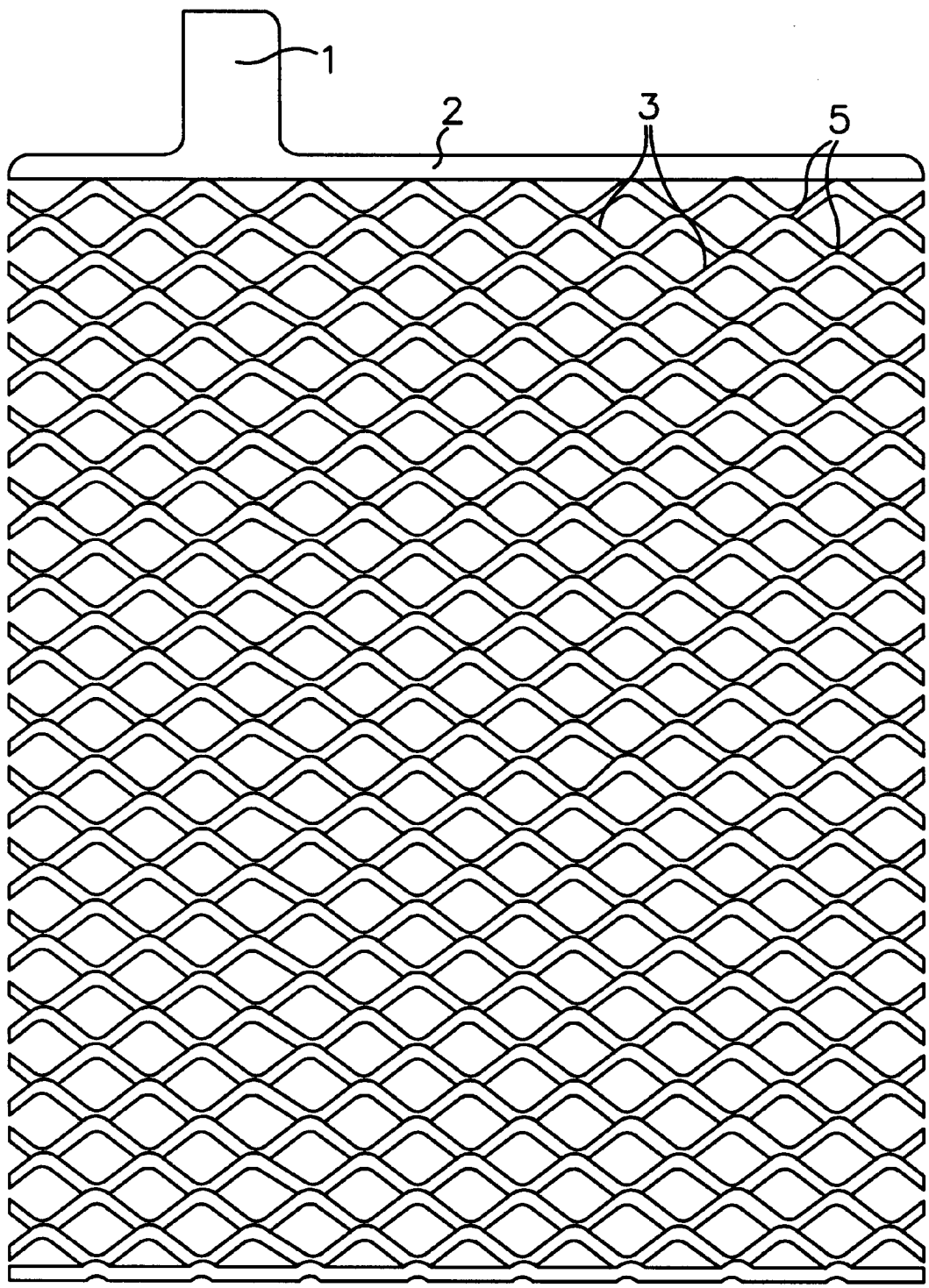
FIG. 2 is a plan view of a grid with smaller twists for use in positive electrodes of a storage battery in an exemplary embodiment of the present invention.

In FIG. 1(a), FIG. 1(b) and FIG. 2, a grid is provided with an upper framework strand 2 and a plurality of strand 3. A plurality of strand 3 cross one another as a connecting section 5. A grid mesh 16 is formed of a plurality of strand crossing one another.

A rotary cutting method can be employed to have twists provided to these strand. By changing the shape of a die cutter, grids having a variety of twists can be produced. When a grid having no twists is to be produced, a reciprocating cutting method can be employed.

Battery (A): A lead-acid storage battery comprises a positive electrode using a grid with a small extent of twist and a negative electrode using a grid with a large extent of twist as in an exemplary embodiment of the present invention.

Battery (B): A lead-acid storage battery comprises positive and negative electrodes both using grids with a small extent of twist, respectively.

Battery (C): A lead-acid storage battery comprises a positive electrode using a grid with a large extent of twist and a grid with a small extent of twist.

Battery (D): A lead-acid storage battery comprises positive and negative electrodes both using grids with a large extent of twist, respectively.

Figure 3:
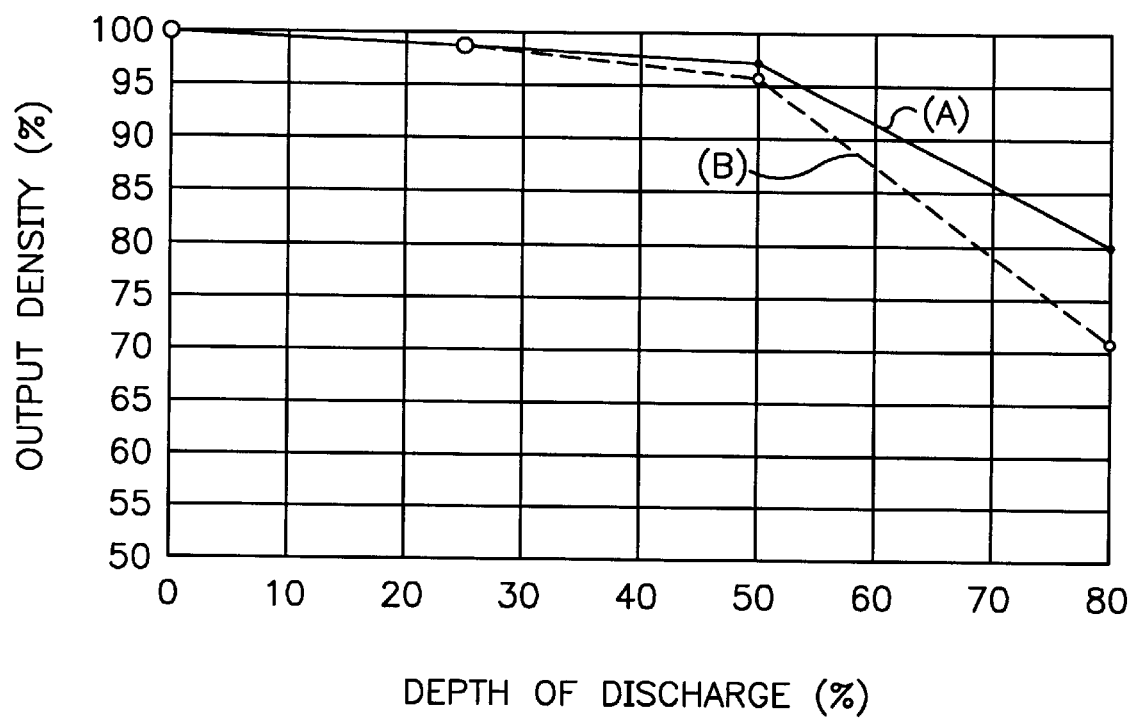
FIG. 3 is a graph to show the output characteristics of a storage battery in an exemplary embodiment of the present invention.

In FIG. 3, the output characteristics of the batteries thus prepared are shown. Battery (A) in the present exemplary embodiment comprising a negative electrode using a grid with a large extent of twist has a large output density in the domain deep in the depth of discharge when compared with Battery (B) comprising positive and negative electrodes both using grids with a small twist, respectively.

In other words, Battery (A) has better output characteristics than Battery (B).

Figure 4:
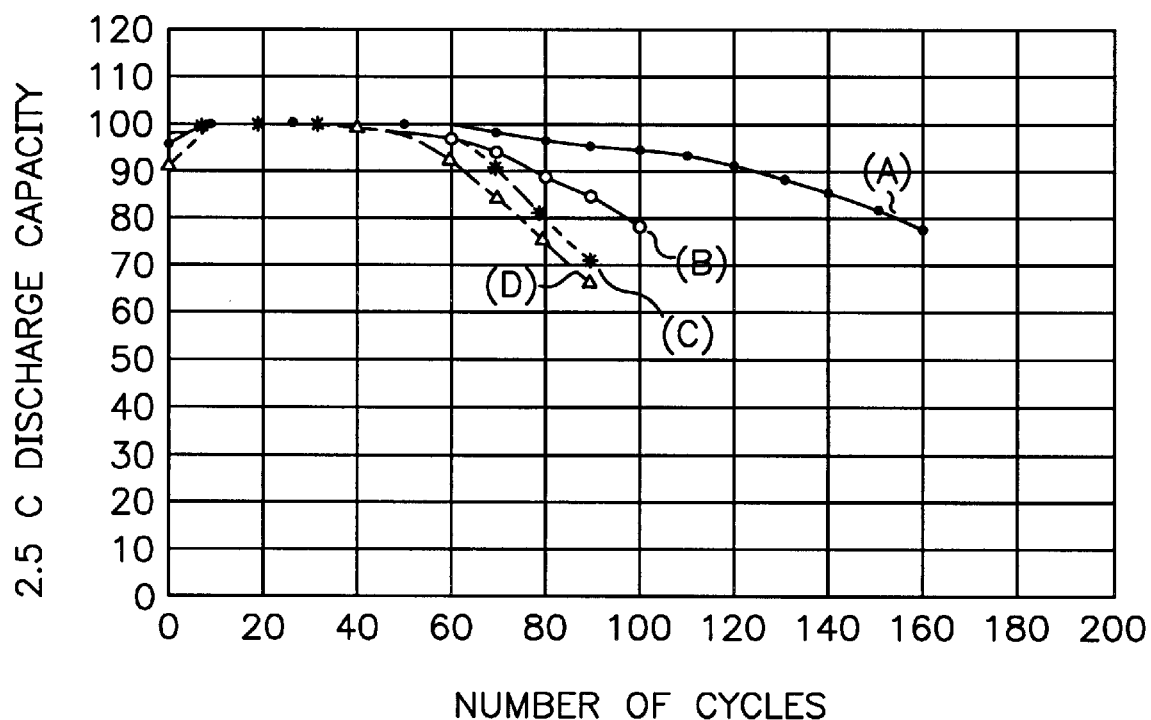
FIG. 4 is a graph to show the high rate discharge cycle life characteristics of a storage battery in an exemplary embodiment of the present invention.

In FIG. 4, the high rate discharge cycle life characteristics of the various batteries produced as described in the above are shown. The cycle tests for the above high rate discharge cycle life characteristics are constructed as follows:

A battery is discharged to 1.65 V/cell at a constant current of 2.5 CA and then charged at a two step constant current, thus having finished 1 cycle.

A two step constant current charging is a method of charging to 2.4 V at a first step charge current (0.2 CA) and then charging for 4 hours at a second step charge current (0.05 CA).

From these test results, it is known that Battery (A) of the present exemplary embodiment has shown the longest life. Since the positive electrodes and negative electrodes of Battery (A) govern the capacity of the battery at the same time, it is learned that the life balance between the positive and negative electrodes is in a very favorable state. As a result, it is known that Battery (A) of the present exemplary embodiment has stable output characteristics and extremely excellent high rate discharge life characteristics when compared with prior art batteries.

As clarified in the above description, degradation of output characteristics in a domain deep in the depth of discharge can be prevented according to the present invention.

Moreover, the high rate discharge cycle life characteristics are extensively improved. Therefore, in an application such as a lead-acid storage battery for electric cars, wherein stable high output characteristics and durability in high rate discharge life are required, the industrial value of the battery of the present invention is extremely high.

What is claimed is:

1. A storage battery comprising;
   a positive electrode, a negative electrode and an electrolyte material, wherein
      said negative electrode has a first grid with a first grid geometry and a first active material provided on said first grid;
      said positive electrode has a second grid with a second grid geometry and a second active material provided on said second grid; and
      said first grid includes a plurality of first twisted strands having a first extent of twist
      said second grid includes a plurality of second twisted strands, having a second extent of twist smaller than said first extent of twist.

2. The storage battery according to claim 1, wherein said first grid includes an expanded grid.

3. The storage battery according to claim 1, wherein said first grid includes an expanded grid that is produced by processing a belt shaped material.

4. The storage battery according to claim 1, wherein said first grid is formed of at least one material selected from the group consisting of lead and lead alloys.

5. A storage battery comprising:
   a positive electrode, a negative electrode and an electrolyte material, wherein said negative electrode has a first grid with a first grid geometry and a first active material provided on said first grid;

said positive electrode has a second grid with a second grid geometry and a second active material provided on said second grid; and said first grid includes a plurality of first twisted strands and a first connecting section for each respective grid strand of said plurality of first twisted strands, said second grid includes a plurality of second strands that are not twisted, and a second connecting section for each respective grid strand of said plurality of second strands.

6. The storage battery according to claim 1, wherein said second grid is formed of at least one material selected from the group consisting of lead and lead alloys.

7. The storage battery according to claim 1, wherein said first grid includes an expanded grid produced by a rotary cutting method.

8. The storage battery according to claim 1, wherein said second grid includes an expanded grid produced by a reciprocating cutting method.

9. A storage battery comprising:

a positive electrode, a negative electrode and an electrolyte material, wherein said negative electrode has a first expanded grid and a first active material provided on said first grid;

said positive electrode has a second expanded grid and a second active material provided on said second grid;

said first and second expanded grids are formed of at least one belt shaped material selected from the group consisting of lead and lead alloys;

said first grid includes a plurality of first twisted strands having a first extent of twist;

said second grid includes a plurality of second twisted strands having a second extent of twist smaller than said first extent of twist.

* * * * *